US011268623B2

(12) United States Patent
Lindell

(10) Patent No.: US 11,268,623 B2
(45) Date of Patent: Mar. 8, 2022

(54) VALVE GEARBOX COVER SYSTEMS AND METHODS

(71) Applicant: FLINT HILLS RESOURCES, LC, Wichita, KS (US)

(72) Inventor: Robert M. Lindell, Cottage Grove, MN (US)

(73) Assignee: FLINT HILLS RESOURCES, LC, Wichita, KS (US)

( * ) Notice: Subject to any disclaimer, the term of this patent is extended or adjusted under 35 U.S.C. 154(b) by 0 days.

(21) Appl. No.: 15/929,074

(22) Filed: Dec. 21, 2018

(65) Prior Publication Data

US 2019/0195380 A1 Jun. 27, 2019

Related U.S. Application Data

(60) Provisional application No. 62/609,593, filed on Dec. 22, 2017.

(51) Int. Cl.
*F16K 27/12* (2006.01)
*F16K 27/02* (2006.01)
*F16K 31/53* (2006.01)
*F16K 35/10* (2006.01)

(52) U.S. Cl.
CPC .......... *F16K 27/12* (2013.01); *F16K 27/0263* (2013.01); *F16K 31/535* (2013.01); *F16K 31/53* (2013.01); *F16K 35/10* (2013.01)

(58) Field of Classification Search
CPC ........................................................ F16K 27/12
USPC .............................. 137/377, 381, 382, 382.5
See application file for complete search history.

(56) References Cited

U.S. PATENT DOCUMENTS

| 1,001,779 | A | * | 8/1911 | Slack | ...................... F16K 35/10 |
| | | | | | 137/382 |
| 6,164,345 | A | | 12/2000 | Haddox | |
| 6,173,733 | B1 | * | 1/2001 | Pruitt | ...................... E03B 7/077 |
| | | | | | 137/377 |
| 6,636,037 | B1 | | 10/2003 | Ou-yang | |
| 7,013,249 | B1 | | 3/2006 | Davis | |
| 7,210,497 | B2 | * | 5/2007 | Herz | ...................... F16K 17/044 |
| | | | | | 137/469 |
| 2009/0164143 | A1 | | 6/2009 | Duckworth et al. | |
| 2010/0207620 | A1 | | 8/2010 | Gies | |
| 2010/0327858 | A1 | | 12/2010 | Simek et al. | |

(Continued)

FOREIGN PATENT DOCUMENTS

WO 2012103541 A2 8/2012
WO 2017052712 A2 3/2017
(Continued)

OTHER PUBLICATIONS

"GMR sensors for magnetic Stray field crack test", retrieved from https://d-nb.info/1082625817/34, Dec. 8, 2014, 96 pages.
(Continued)

*Primary Examiner* — Paul J Gray

(57) ABSTRACT

A valve includes a cover that is transparent and configured to allow a valve orientation to be visible through the valve cover. The cover may couple to existing mounting bolts of the valve operator housing such that the cover may be retrofitted onto existing valves. The cover may be sized and shaped to prevent water, or other weather, ingress into the valve operator housing.

11 Claims, 6 Drawing Sheets

(56) References Cited

U.S. PATENT DOCUMENTS

| | | | |
|---|---|---|---|
| 2013/0340857 A1* | 12/2013 | Crochet, Sr. | F16K 27/12 137/377 |
| 2014/0088889 A1 | 3/2014 | Duckworth | |
| 2014/0294285 A1 | 10/2014 | Duckworth | |
| 2015/0377012 A1 | 12/2015 | Liu et al. | |
| 2016/0274060 A1 | 9/2016 | Denenberg et al. | |
| 2017/0114907 A1 | 4/2017 | Colpan et al. | |
| 2017/0284903 A1 | 10/2017 | Anderson et al. | |
| 2019/0093829 A1 | 3/2019 | Andrew et al. | |
| 2019/0094182 A1 | 3/2019 | Andrew et al. | |
| 2019/0162700 A1 | 5/2019 | Andrew et al. | |
| 2019/0195380 A1 | 6/2019 | Lisle | |

FOREIGN PATENT DOCUMENTS

| | | |
|---|---|---|
| WO | 2019058277 A1 | 3/2019 |
| WO | 2019058278 A1 | 3/2019 |
| WO | 2019102441 A1 | 5/2019 |
| WO | 2019123426 A1 | 6/2019 |

OTHER PUBLICATIONS

"T.D. Williamson introduces Spiral Magnetic Flux Leakage inspection tool", accessed at https://www.worldoil.com/news/2010/11/1/td-williamson-introduces-spiral-magnetic-flux-leakage-inspection-tool, Nov. 1, 2010, 2 pages.

Bubenik, T., "Managing Cracks", accessed at https://www.dnvgl.us/Downloads/Crack%20Management_Seminar_Bubenik_tcml4-80291.pdf, 2016, 30 pages.

Frank Niese, "EMUS wall thickness sensor for the pipeline inspection with integrated Eddy current and leakage flux test", Dissertation submitted to Doctor of Engineering (Dr.-Ing.) the Faculty of Science and Technology III Chemistry, pharmacy, bio and materials science the Saarland University, 2010, 167 pages, Abstract only.

Harris, C., "Overcoming missing or incomplete pipeline data in ageing assets: ILI and NDE techniques combine to provide traceable, verifiable, and complete records", Ageing Pipelines Conference, Oct. 9, 2015, 11 pages.

International Preliminary Report on Patentability for International Application No. PCT/IB2018/057216, dated Mar. 24, 2020, 8 pages.

International Preliminary Report on Patentability for International Application No. PCT/IB2018/057218, dated Mar. 24, 2020, 16 pages.

International Search Report and Written opinion for International Application No. PCT/IB2018/057216, dated Jan. 25, 2019, 11 pages.

International Search Report and Written Opinion for International Application No. PCT/IB2018/057218, dated Feb. 4, 2019, 16 pages.

International Search Report and Written opinion for International Application No. PCT/IB2018/060537, dated Apr. 17, 2019, 8 pages.

International Search Report and Written opinion for International Application No. PCT/IB2018/59363, dated Apr. 3, 2019, 10 pages.

Kirkwood, "Overcoming limitations of current in-line inspection technology by applying a new approach using SMFL", by applying a new approach using Spiral Magnetic Flux Leakage (SMFL), Proceedings / 6th Pipeline Technology Conference 2011, 14 pages.

Nestlenorth, J.B., "Circumferential MFL In-Line Inspection for Cracks in Pipelines", Department of Energy National Engineering Technology Laboratory, Jun. 2003, 49 pages.

* cited by examiner

VALVE GEARBOX COVER SYSTEMS AND METHODS

CROSS-REFERENCE TO RELATED APPLICATIONS

This application claims priority to U.S. Provisional Application No. 62/609,593, filed on Dec. 22, 2017. The disclosure of the above applications is incorporated by reference in their entirety.

BACKGROUND

The efficient transportation of petroleum products (crude oil, gasoline, chemicals, natural gas) is critical to meeting the world's energy demands. Pipelines, rail cars, tankers, ships, and trucks all work in harmony in the transportation network to deliver energy to consumers. One of the most critical components of this network is the pipeline. North America alone depends on over 185,000 miles of liquid petroleum pipelines, 320,000 miles of gas transmission pipelines, and more than two million miles of gas distribution pipelines.

Pipelines are often located above ground and susceptible to natural weather, such as rain, snow, hail, wind, etc. Maintenance along the pipeline may cause significant lost profits and downtime.

SUMMARY

Embodiments herein significantly reduce downtime along the pipeline by providing a valve gearbox cover that reduces ingress of water, or other aspects of weather, into the valve gearbox. In embodiments, the valve gearbox cover is a non-porous, weatherproof, material that covers the top seam of the valve gearbox which is a typical access point for said water or other weather. By covering this top seam, the valve gearbox cover eliminates, either totally or significantly, water from entering the gearbox where said water/weather may cause degradation of the valve part. In embodiments, the cover may be clear such that valve orientation is always visible through the cover. In embodiments, the cover may be stable across ultra-violet (UV) wavelengths such that the clarity of the valve gearbox cover is not compromised via exposure to the sun and other weather. These and other aspects of the valve gearbox cover discussed herein provide the advantage of significantly reduced downtime to the pipeline by reducing the maintenance required along the valves of the pipeline.

In embodiments, a valve gearbox cover comprises a valve cover sized and shaped to shroud a valve gearbox, the valve cover being transparent and configured to allow a valve orientation to be visible through the valve cover.

In embodiments, a valve system comprises a housing including a top housing and a valve operator housing, the housing surrounding a valve operator. The valve system further comprises a cover configured to shroud a portion of the housing, the cover being transparent and configured to allow a valve orientation to be visible through the cover.

In embodiments, a method for covering a valve comprises attaching a valve cover sized and shaped to shroud at least a portion of the valve, the valve cover being transparent and configured to allow a valve orientation to be visible through the valve cover.

BRIEF DESCRIPTION OF THE FIGURES

FIG. 6 depicts the internal valve operator of a prior art valve that does not include the valve cover of FIGS. 1-4.

DETAILED DESCRIPTION OF THE EMBODIMENTS

Figure 1:
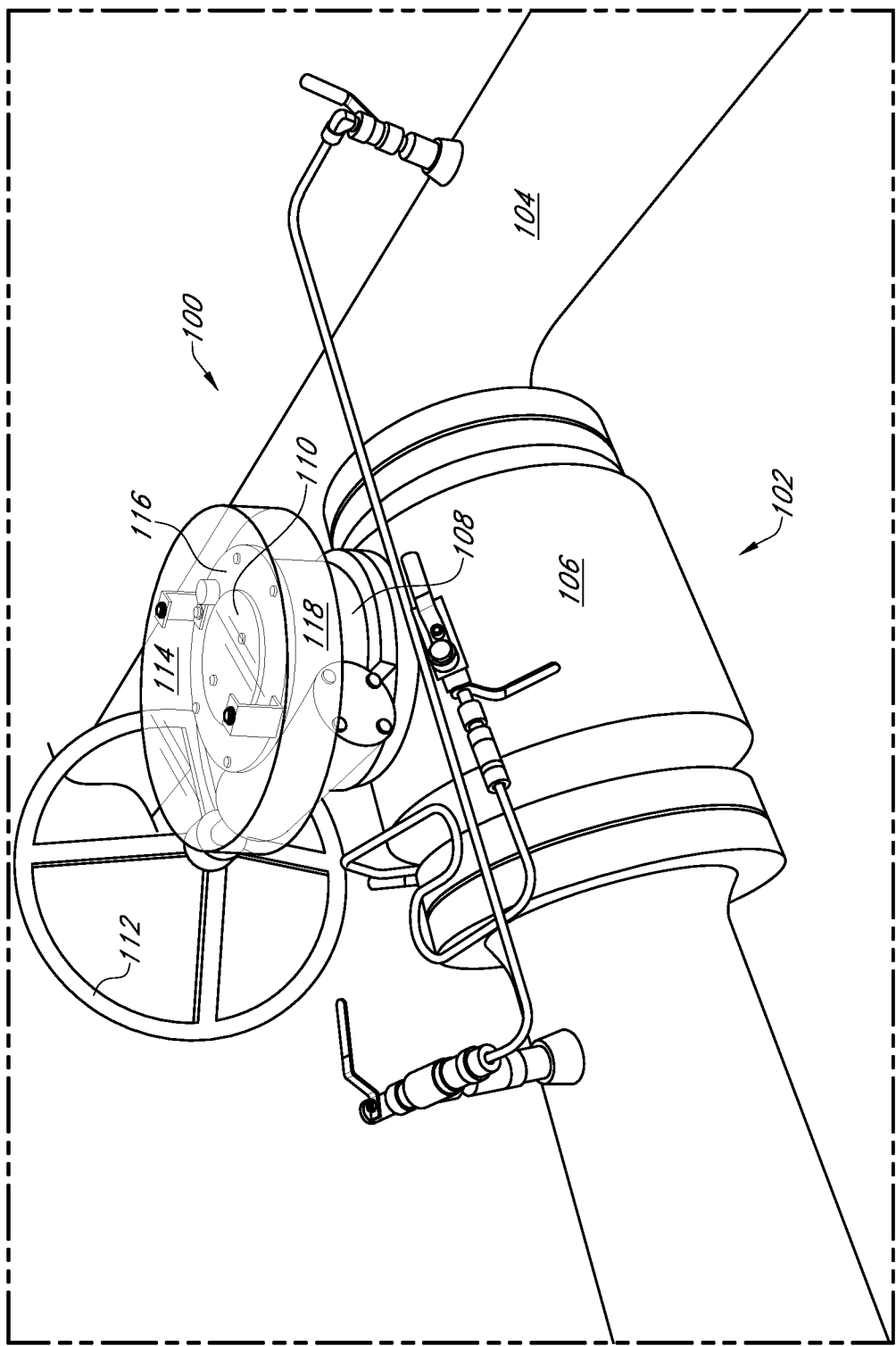
FIG. 1 depicts a perspective view of a valve system of a pipeline including a valve cover, in embodiments.
Figure 2:
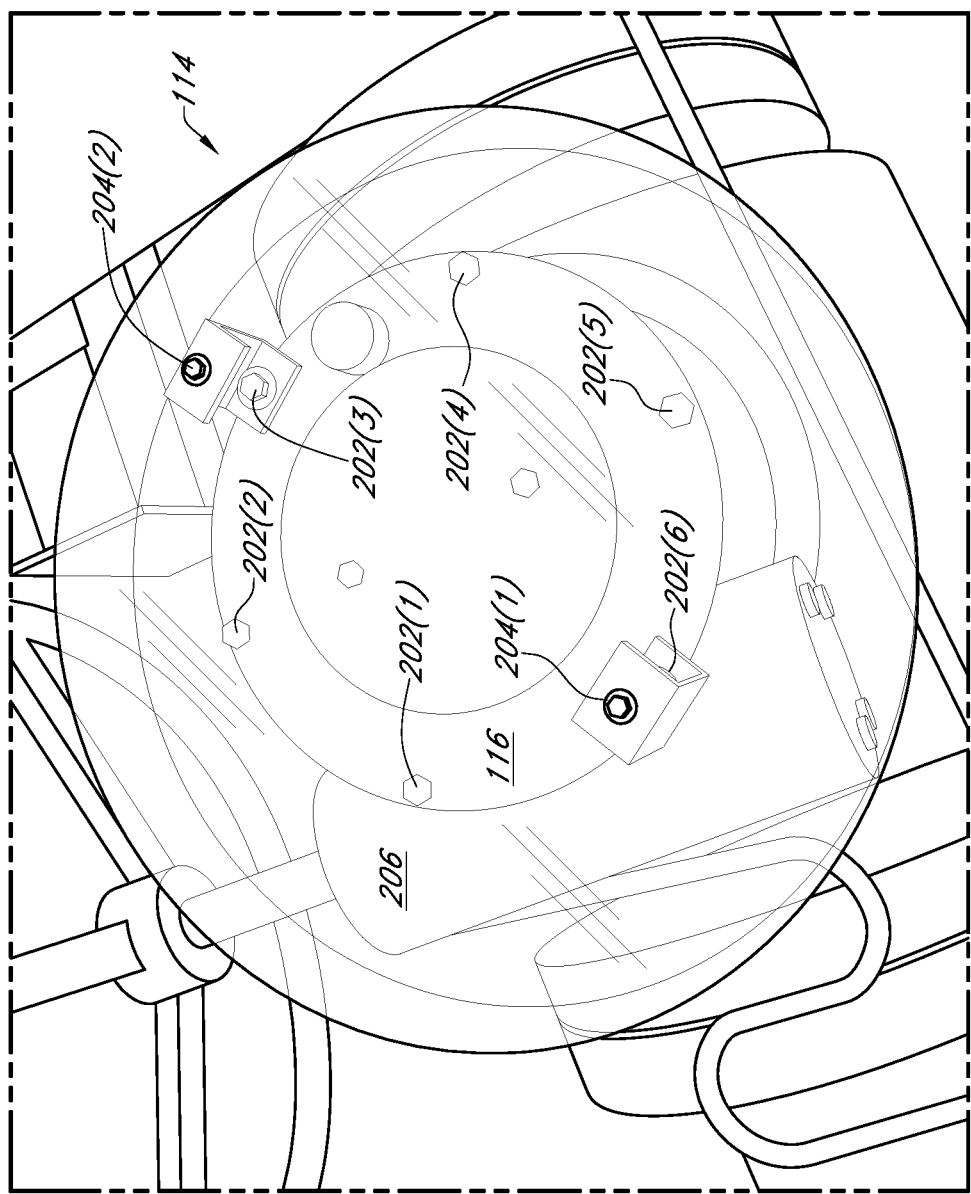
FIG. 2 depicts a top view of the valve system including a valve cover of FIG. 1, in embodiments.
Figure 3:
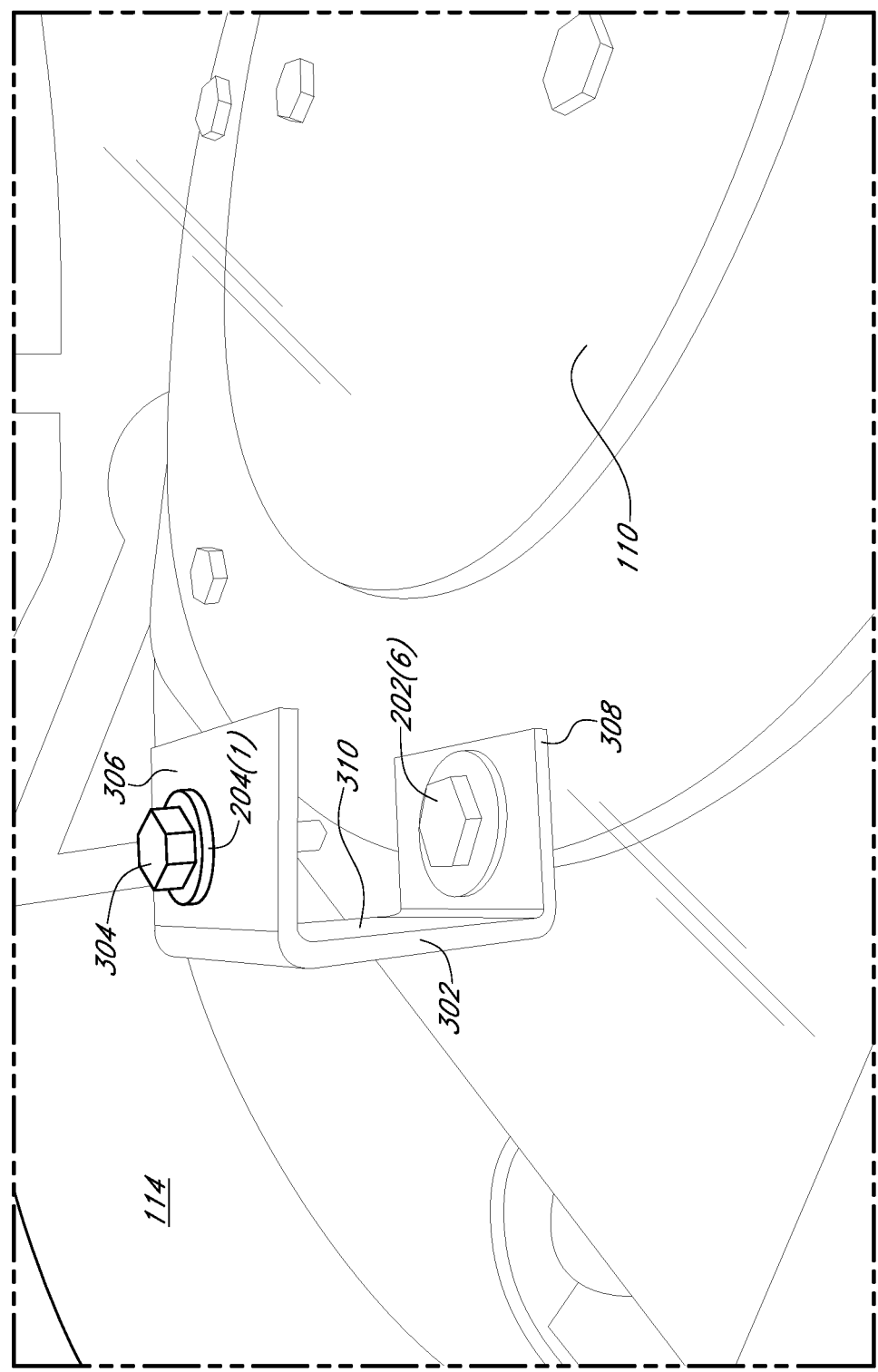
FIG. 3 depicts a zoomed-in view of the bracket of the valve system including a valve cover in FIGS. 1-2, in embodiments.
Figure 4:
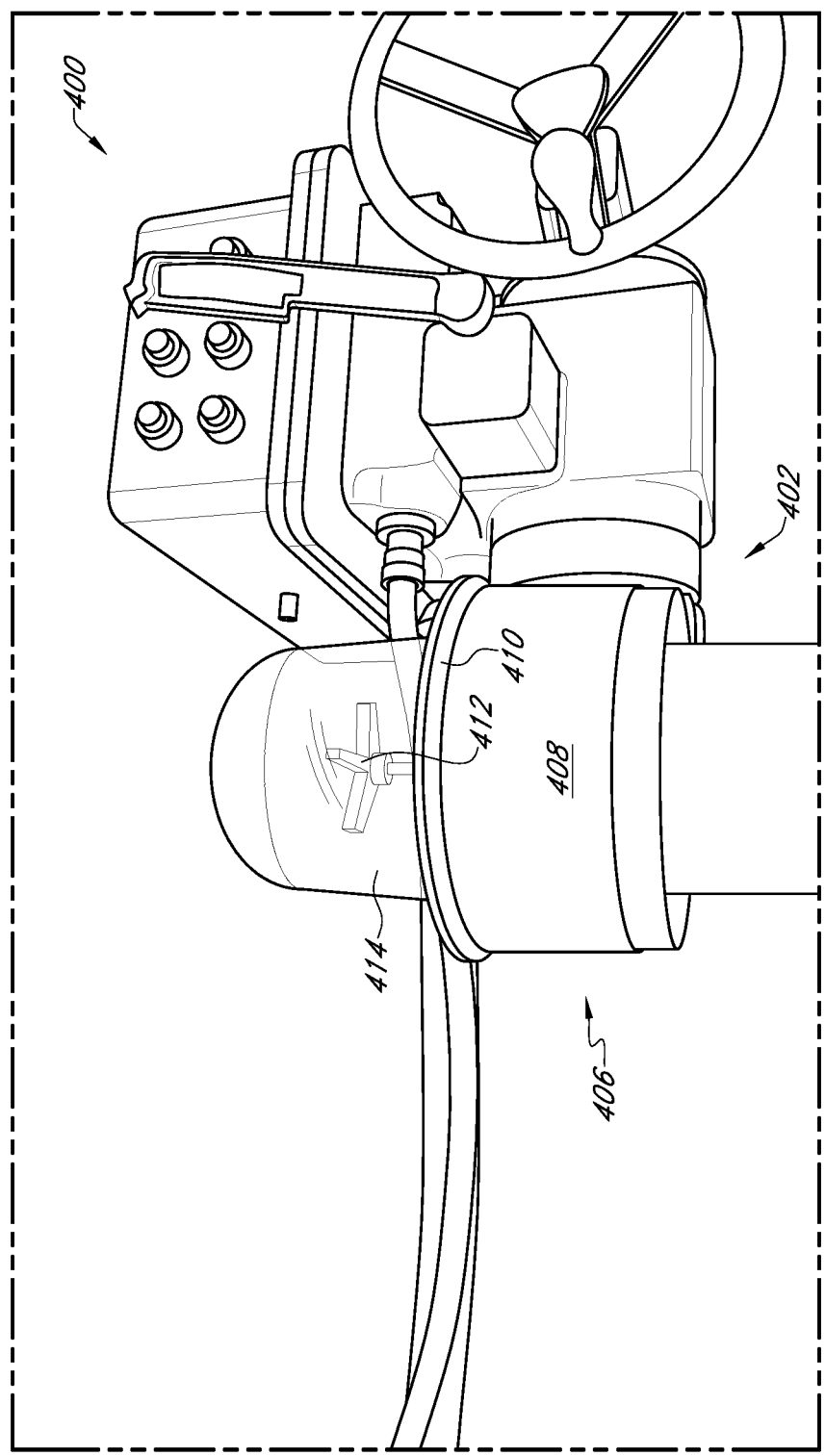
FIG. 4 depicts a valve system including a valve cover, in embodiments.

FIG. 1 depicts a perspective view of a valve system 100 of a pipeline, in embodiments. FIG. 2 depicts a top view of the valve system 100, in embodiments. FIG. 3 depicts a zoomed-in view of the bracket 302 of valve system 100, in embodiments. FIG. 4 depicts a valve system 400, in embodiments. FIGS. 1-4 are best viewed together with the following description.

Valve system 100 includes a valve 102 for use in pipeline 104. Although valve 102 is shown as a ball valve, valve 102 may be any type of valve including, but not limited to, floating ball valves, trunion ball valves, gate valves, globe valves, needle valves, butterfly valves, check valves, relief valves, etc. Valve 102 may include a valve operator housing 106 that surrounds internal components of the valve 102 (such as, but not limited to, valve seats, valve bearings, valve seals, valve fittings, etc.).

Valve 102, as shown, includes a valve operator housing 108 and a top housing 110. Valve operator housing 108 and top housing 110 collectively surround a valve operator (not shown) therein for controlling the orientation of the valve housed by valve operator housing 106. Valve operator housing 108 and top housing 110 may be components of valve operator housing 106. A handwheel 112 may extend through components of the valve operator housing 106 (e.g., through valve operator housing 108) such that an operator may manually control the orientation of the valve 102 (e.g., open, closed orientations controlling fluid/gas/material flow within valve 102).

Valve system 100 includes a valve cover 114 configured to prevent intrusion of external elements into the valve 102, such as within valve operator housing 108 and/or top housing 110. For example, valve cover 114 may prevent intrusion of external elements such as rain, snow, ice, hail, wind, etc. by being non-porous such that the elements are directed away from valve operator housing 108. In embodiments, valve cover 114 is transparent and configured to allow a valve orientation to be visible through the valve cover. In embodiments, valve cover 114 is a plastic material that is billow formed, thereby reducing costs. In embodiments, valve cover 114 is a material color-stable across ultra-violet wavelengths such that extended exposure to sunlight does not cause color-fading of the valve cover 114.

The embodiment of valve cover 114 shown in FIG. 1 includes a top surface 116 and a side surface 118 extending directly therefrom. Side surface 118 is sized such that it extends a distance beyond a seam between top housing 110 and valve operator housing 108 such that external elements cannot ingress into the valve operator housing 108. Top surface 116 is shown as circular, and side surface 118 is shown as cylindrical. However, it should be appreciated that the valve cover 114 may be any shape and/or size as desired to fit a particular valve. Billow forming, discussed above, allows custom shapes and sizes to be created with minimal cost.

As shown in FIG. 2, top housing 110 may couple to valve operator housing 108 (FIG. 1) via one or more mounting apertures at locations 202. Bolts are shown located at mounting locations 202 securing top housing 110 to valve operator housing 108. Although six mounting locations 202 are shown, it should be appreciated that there may be more or fewer in any given system without departing from the scope herein. Valve cover 114 may couple to valve operator housing 106 (e.g. the top housing 110, the valve operator housing 108, or another portion of the housing 106). In embodiments, valve cover 114 couples to housing 106 at one or more of the mounting locations 202. To couple to the housing 106, valve cover 114 may include one or more mounting apertures 204 at positions corresponding to the locations of the mounting locations 202. In the embodiment of FIGS. 1-3, the mounting apertures 204 are not located symmetrically on top surface 116 such that valve cover 114 may cover multiple components of the housing 106 (e.g. including handwheel cover 206 at which handwheel 112 extends into to control operation of valve 102). In embodiments, the same bolts used to couple top housing 110 to valve operator housing 108 may couple valve cover 114 to top housing 110.

As shown in FIG. 3, it may be desirable to space valve cover 114 from housing 106. As such, in embodiments, a bracket 302 may be located at one or more of the mounting locations 202. It should be appreciated that, in embodiments, there are multiple brackets 302 located at respective ones of the mounting locations 202. Bracket 302 is shown having a "U" shape such that the bolt securing top housing 110 to valve operator housing 106 couples bracket 302 to the top housing 110. Bracket 302 may have a first height that is less than a second height of the side surface 118 of the valve cover 114. For example, bracket 302 is shown having a first coupling portion 306 and a second coupling portion 308 spaced via a spacing portion 310. A separate fastener 304 may then couple the valve cover 114 to the bracket 302. It should be appreciated, however, that in embodiments the bolt may simultaneously couple the valve cover 114 to the bracket 302, and the bracket 302 to top housing 110 without departing from the scope hereof. In other words, certain embodiments may not include fastener 304. Moreover, bracket 302 may be any arbitrary shape and not a "U" shape without departing from the scope hereof.

FIG. 4 depicts another embodiment of a valve system 400. Valve system 400 includes valve 402 having a valve operator housing 406. Valve operator housing 406 may include a valve operator housing 408 and a top housing 410. Valve 402 may be controlled via handwheel 412. Valve system 400 may include valve cover 414. Valve cover 414 differs from valve cover 114 in that, instead of a flat top surface (e.g. top surface 116), the top surface 416 of valve cover 414 is domed. Moreover, valve cover 414 shrouds not only a portion of valve operator housing 406, but also handwheel 412. As such, it should be appreciated that any component of a valve may be covered by a cover (e.g. valve cover 114, 414) without departing from the scope hereof. Moreover, the cover may be sized and shaped in any desired configuration to fit any desired coverage of the valve. Although not all components of valve system 100 are not discussed with respect to valve system 400, it should be appreciated that any component of valve system 100 (such as bracket 302) may be included in valve system 400 without departing from the scope hereof.

The valve systems 100 and 400, discussed above, are shown with a valve cover 114, 414 having an inner surface open to ambient air. However, it should be appreciated that covers 114, 414 may be sealed to the valve operator housing 106, 406 such that no the inner surface of the cover is sealed from the external elements.

Figure 5:
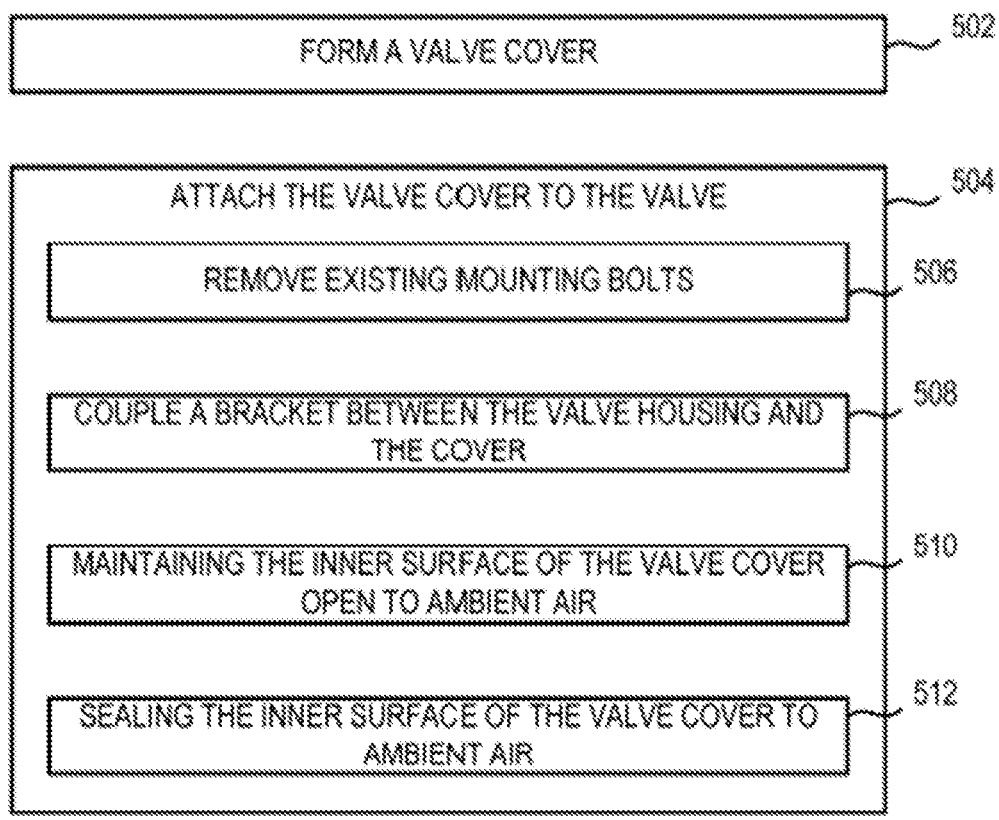
FIG. 5 depicts a method for covering a valve, in embodiments.
Figure 8:
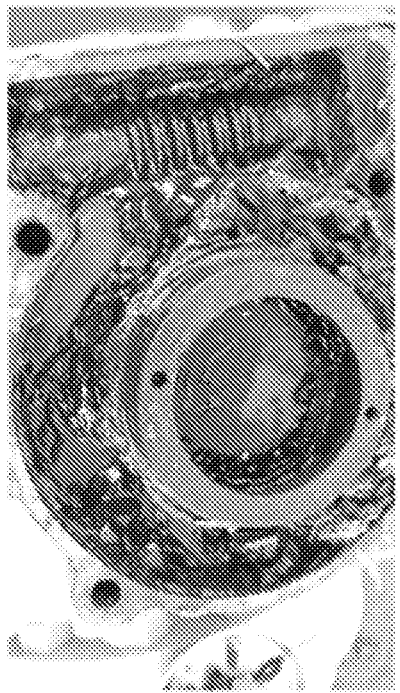

FIG. 5 depicts a method 500 for covering a valve, in embodiments. Method 500 may be implemented using valve system 100 or valve system 400 discussed above. Method 500 may include one or more of the following operations.

In operation 502 of method 500, a valve cover is formed. In one embodiment of operation 502, valve cover 114 and/or valve cover 414 are formed. Operation 502 may be performed using any molding process including, but not limited to, billow forming, thermoforming, injection molding, blow molding, compression molding, gas assist molding, rotational molding, structural foam molding, etc.

In operation 504, a valve cover is attached to a valve. In one embodiment of operation 504, valve cover 114 and/or valve cover 414 is coupled to valve 102 and/or 402, respectively. Operation 504 may include spacing the valve cover from the valve such that rain is prevented from accessing a seam of a housing of the valve.

In operation 506, existing mounting bolts of the valve are removed. In one embodiment of operation 506, mounting bolts at mounting locations 202 are removed from top housing 110.

In operation 508, a bracket is coupled between the valve operator housing and the valve cover. In one embodiment of operation 508, bracket 302 is coupled between valve cover 114 and top housing 110.

In operation 510, the inner surface of the valve cover is maintained open to ambient air. In one example of operation 510, inner surface of valve cover 114 is maintained to external air as shown in FIG. 1.

In operation 512, the inner surface of the valve cover is sealed to ambient air. In one example of operation 512, valve cover 114 is sealed against top housing 110 when mounted.

Figure 7:
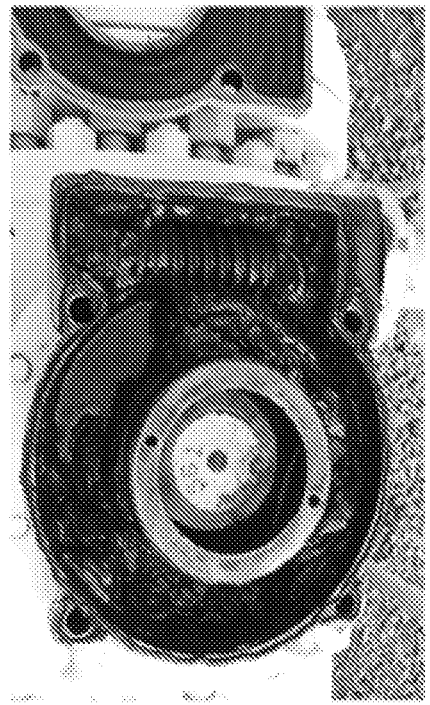
FIG. 7 depicts the internal valve operator of a valve including a valve cover.

The systems and methods described herein provide many significant advantages. Most importantly, the valve cover 114, 414 significantly reduces corrosion within the housing of the valve system. FIG. 6 depicts a prior art valve that does not include valve cover 114 or 414. As seen in FIG. 6, the water seeps into the housing and causes corrosion therein. FIG. 7, on the other hand, depicts a valve, such as valve 102, including valve cover 114. As shown in FIG. 7, there is almost no corrosion within the valve. This allows significantly less maintenance along the pipeline thereby increasing cost and profit.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A valve gearbox cover system, comprising:
   a valve gearbox having: a valve housing and a top housing that collectively surround a valve operator;
   a valve cover that shrouds the valve gearbox, the valve cover comprising:
      a top surface,
      a sidewall coupled with the top surface, at least one mounting aperture each for receiving at least one fastener to couple the valve gearbox cover with respect to the valve gearbox;

the valve cover being transparent and configured to allow a valve orientation to be visible through the valve cover; and a bracket that, when the valve gearbox cover is installed, interfaces with the valve gearbox at location of a mounting fastener that couples the top housing portion to the valve operator housing.

2. The valve gearbox cover system of claim 1, the mounting aperture located at a position corresponding to a mounting bolt of the valve gearbox.

3. The valve gearbox cover system of claim 1, the bracket being coupled to an inner surface of the valve cover for spacing the cover from the valve gearbox.

4. The valve gearbox cover system of claim 1, the bracket located at a position corresponding to a mounting bolt of the housing of the valve gearbox.

5. The valve gearbox cover system of claim 1, the bracket comprising a plurality of brackets.

6. The valve gearbox cover system of claim 5, each bracket of the plurality of brackets located at a respective position corresponding to a respective mounting bolt of the housing of the valve gearbox.

7. The valve gearbox cover system of claim 1, a first height of the sidewall being greater than a second height of the bracket.

8. The valve gearbox cover system of claim 1, the sidewall only coupled to the top surface such that an inner surface of the valve cover configured to be open to ambient air when coupled to the valve gearbox.

9. The valve gearbox cover system of claim 1, the valve cover comprising a material color-stable across ultra-violet wavelengths.

10. The valve gearbox cover system of claim 1, the valve cover being non-porous.

11. The valve gearbox cover system of claim 1, the valve cover being non-porous except at a mounting location.

* * * * *